United States Patent
Kanazashi

(10) Patent No.: US 7,760,837 B2
(45) Date of Patent: Jul. 20, 2010

(54) SYNCHRONIZATION DETERMINATION METHOD AND APPARATUS

(75) Inventor: Kazuyuki Kanazashi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 973 days.

(21) Appl. No.: 11/412,947

(22) Filed: Apr. 28, 2006

(65) Prior Publication Data
US 2007/0160088 A1 Jul. 12, 2007

(30) Foreign Application Priority Data
Jan. 10, 2006 (JP) ............... 2006-002014

(51) Int. Cl.
*H04L 7/00* (2006.01)

(52) U.S. Cl. .................................... 375/368

(58) Field of Classification Search ............... 375/366, 375/368; 370/509, 510, 512, 513
See application file for complete search history.

(56) References Cited

U.S. PATENT DOCUMENTS 5,428,647 A * 6/1995 Rasky et al. ............... 375/366
2002/0012094 A1 1/2002 Suzuki

FOREIGN PATENT DOCUMENTS

| EP | 1 253 460 A2 | 10/2002 |
|---|---|---|
| JP | 58-178653 | 10/1983 |
| KR | 1997-0008931 | 2/1997 |

OTHER PUBLICATIONS

Korean Patent Office Action, mailed Oct. 29, 2007 and issued in corresponding Korean Patent Application No. 10-2006-0038739.
Supplementary European Search Report, mailed Oct. 9, 2007 and issued in corresponding European Patent Application No. 03818572.4-2205.

* cited by examiner

*Primary Examiner*—Kevin Y Kim
(74) *Attorney, Agent, or Firm*—Staas & Halsey LLP

(57) ABSTRACT

A synchronization determination method includes: a synchronization determining step of determining whether or not synchronization has been successfully performed by detecting a synchronous pattern from the demodulated data input as a data stream; a synchronization probability determining step of determining whether or not there is a probability that synchronization is successfully performed using the progress of detecting a synchronous pattern in the synchronization determining step; and a synchronization determination discard step of discarding a determination in the synchronization determining step when it is determined in the synchronization probability determining step that there is no probability that synchronization is successfully performed, and passing control to the process performed when it is determined in the synchronization determining step that synchronization has not been successfully performed.

10 Claims, 6 Drawing Sheets

SEQUENCE 1: ADJUSTMENT (PULLING) WITH LOW PRECISION

SEQUENCE 2: ADJUSTMENT (PULLING) WITH INTERMEDIATE PRECISION

SEQUENCE 3: ADJUSTMENT (PULLING) WITH HIGH PRECISION

SEQUENCE 4: FRAME SYNCHRONIZATION DETERMINATION

SEQUENCE 5: COMPLETION AND MONITORING

F I G. 3                      PRIOR ART

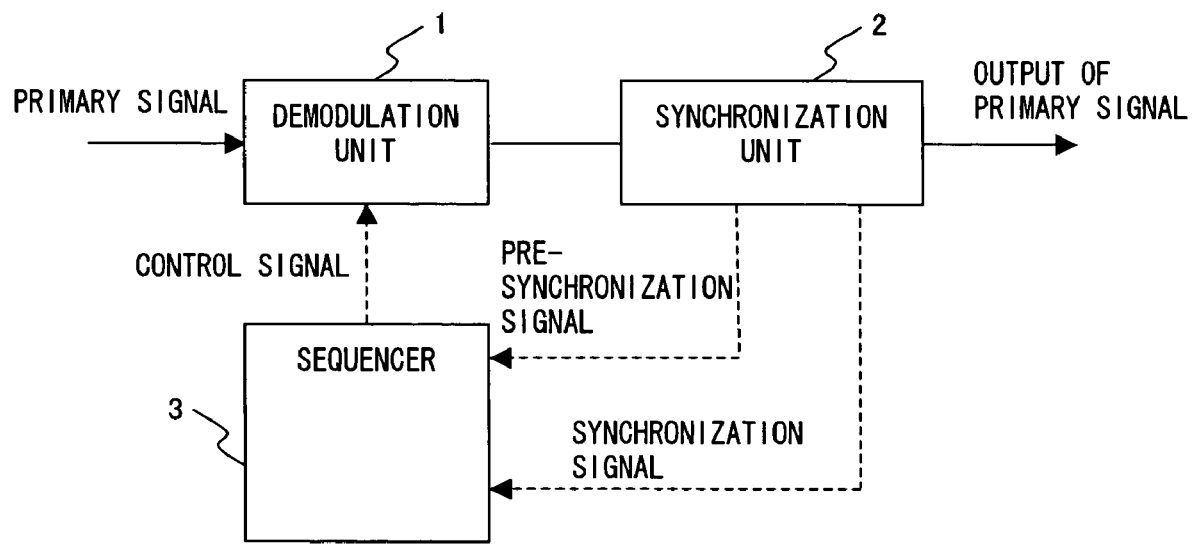
F I G. 4

SYNCHRONIZATION DETERMINATION METHOD AND APPARATUS

CROSS-REFERENCE TO RELATED APPLICATIONS

This application is based upon and claims the benefit of priority from the prior Japanese Patent Application No. 2006-002014 filed on Jan. 10, 2006, the entire contents of which are incorporated herein by reference.

BACKGROUND OF THE INVENTION

1. Field of the Invention

The present invention relates to a method and an apparatus for determining whether or not synchronization has been successfully performed by detecting a synchronous pattern in demodulated data.

2. Description of Related Art

A reception device having a demodulation unit, etc. receives a receiving wave (modulated wave), and an pulling operation is performed according to a predetermined pulling sequence. An example of the pulling sequence is explained below by referring to FIGS. 1 through 3. In the present invention, the demodulation unit is a digital demodulator of the synchronous detection system.

FIG. 1 is a flowchart showing an example of an pulling sequence.

As shown in FIG. 1, in sequences (hereinafter referred to as "seq.") 1 through 3, the adjustment control for allowing the oscillation frequency of a voltage control oscillator in a demodulation unit to track the carrier frequency of a receiving wave (modulated wave) is performed with low precision, intermediate precision, and high precision in this order. That is, the adjusting step is first performed roughly. Practically, a low-precision adjustment is first performed such that an adjustment can be made in a wide range, then an intermediate-precision adjustment is made, and finally a high-precision adjustment is made, thereby performing the adjustment (pulling).

Next, in seq. 4, a synchronous pattern (for example, a pattern formed by synchronous bytes) is detected from the demodulated data input from the demodulation unit, and it is determined whether or not frame synchronization has been successfully performed.

Detecting a synchronous pattern from demodulated data as described above is described in, for example, the patent document 1 (Japanese Published Patent Application No. S58-178653).

In the determination in seq. 4, when a determination result is YES, control is passed to seq. 5, the pulling sequence is completed, and control is passed to a monitor sequence. When the determination result in seq. 4 is NO, control is returned to seq. 1, and the above-mentioned processes are repeated until the determination result in seq. 4 becomes YES.

In the above-mentioned pulling sequence, when the synchronous pattern detected from the demodulated data by the frame synchronization determination above in the seq. 4 is assumed to be the synchronous bytes in the bit stream of frames, wherein one packet are formed by 204 bytes and each frame is formed by one packet having synchronous byte of 0×B8 as a leading byte and seven packets each having synchronous byte of 0×47 as a leading byte, in the determination in seq. 4, it is necessary to detect all synchronous bytes in the certain number of continuous frames to avoid erroneous determination. In this case, it is normally considered that it is necessary to detect all synchronous bytes in the five or more continuous frames.

In the frame synchronization determination in seq. 4, although it is determined that the frame synchronization is successfully performed if all synchronous bytes can be detected in five continuous frames, the period assigned to the determination in seq. 4 is set to approximately double the shortest possible time in which the frame synchronization could be successfully performed from the start of determination (in this example, the time required to detect all synchronous bytes in the five continuous frames) to include a margin because the frame synchronization is not necessarily performed successfully immediately after the start of the process in seq. 4. In detecting the five frames, the data of 204*8*5=8160 bytes is necessary. To collect the data of 8160 bytes, 10 ms are required in the system condition of 16 QAM (quadrature amplitude modulation) and 1.6 Mbaud.

In the sequence design in the above-mentioned pulling sequence, when it takes some time to determine whether or not the frame synchronization has been successfully performed, the period of the pulling sequence is restricted.

For example, in the pulling sequence shown in FIG. 1, if 40 ms, 20 ms, 20 ms, and 20 ms are respectively assigned to seq. 1, seq. 2, seq. 3, and seq. 4 as shown in FIG. 3, then the long time of 20 ms (20%) out of the total time of 100 ms (in one period) for seq. 1 through 4 is used in determination of seq. 4, and there is only 80 ms (80%) for adjustment of low, intermediate, and high precision for seq. 1 through 3. The synchronization signal shown in FIG. 3 indicates "H" when a condition with which it can be determined that frame synchronization has been successfully performed (for example, that all synchronous bytes in five continuous frames are detected) is satisfied. Otherwise, it indicates "L". Therefore, it is determined by detecting the synchronization signal of "H" that frame synchronization has been successfully performed. In the example shown in FIG. 3, it is determined that frame synchronization has not been successfully performed in the frame synchronization determination in the first period, but that frame synchronization has been successfully performed in the frame synchronization determination in the second period.

As described above, in the frame synchronization determination in seq. 4, it is necessary to detect all synchronous bytes in the certain number of continuous frames, and the time longer than the shortest time required to determine that frame synchronization has been successfully performed after starting the determination is assigned to seq. 4. Therefore, when the time assigned to seq. 1 through 4 (one period) is predetermined, the time assigned to an adjustment with low, intermediate, and high precision for seq. 1 through 3 becomes relatively shorter when the time required to detect a frame in seq. 4 becomes longer, and there can be the possibility that a complete adjustment is not made. Therefore, when a complete adjustment is not made, the probability that frame synchronization is successfully performed becomes low, and the time (pulling operation time) required to complete an pulling sequence becomes long.

SUMMARY OF THE INVENTION

The present invention has been developed to solve the above-mentioned problem, and aims at providing the synchronization determination method and the synchronization determination apparatus capable of performing an pulling operation at a high speed.

To attain the above-mentioned advantage, the synchronization determination method according to the first aspect of the present invention includes: a synchronization determining step of determining whether or not synchronization has been successfully performed by detecting a synchronous pattern from the demodulated data input as a data stream; a synchronization probability determining step of determining whether or not there is a probability that synchronization is successfully performed using the progress of detecting a synchronous pattern in the synchronization determining step; and a synchronization determination discard step of discarding a determination in the synchronization determining step when it is determined in the synchronization probability determining step that there is no probability that synchronization is successfully performed, and passing control to the process performed when it is determined in the synchronization determining step that synchronization has not been successfully performed.

The synchronization determination apparatus according to the second aspect of the present invention includes: a synchronization determination unit for determining whether or not synchronization has been successfully performed by detecting a synchronous pattern from the demodulated data input as a data stream; and a synchronization probability determination unit for determining whether or not there is a probability that synchronization is successfully performed using the progress of detecting a synchronous pattern by the synchronization determination unit. The apparatus discards a determination by the synchronization determination unit when it is determined by the synchronization probability determination unit that there is no probability that synchronization is successfully performed, and passes control to the process performed when it is determined by the synchronization determination unit that synchronization has not been successfully performed.

The synchronization determination apparatus according to the third aspect of the present invention includes: a synchronous pattern detection unit for outputting a signal indicating that a first condition has been satisfied as a synchronization signal when the first condition with which it can be determined that synchronization has been successfully performed by detecting a synchronous pattern from demodulated data input as a data stream is satisfied, and outputting a signal indicating that a second condition has been satisfied as a pre-synchronization signal when the second condition with which it can be determined that there is a probability that frame synchronization is successfully performed is satisfied; and a determination unit for determining based on the synchronization signal whether or not synchronization has been successfully performed, and determining based on the pre-synchronization signal whether or not there is a probability that synchronization is successfully performed. The determination unit discards a determination as to whether or not synchronization has been successfully performed when it cannot be determined within a predetermined time from starting a determination as to whether or not synchronization has been successfully performed that there is a probability that synchronization is successfully performed, and passes control to the process performed when it is determined that synchronization has not been successfully performed.

According to the above-mentioned method and apparatus, when it is determined that there is no possibility that synchronization is successfully performed, a determination as to whether or frame synchronization has been successfully performed is discarded, and control is passed to the process performed when it is determined that synchronization has not been successfully performed. Therefore, the time required to determine, when there is no possibility that frame synchronization is successfully performed, whether or not synchronization has been successfully performed is saved.

BRIEF DESCRIPTION OF THE DRAWINGS

FIG. 4 is a block diagram showing a part of the configuration of the reception device including the synchronization determination apparatus according to an embodiment of the present invention;

DESCRIPTION OF THE PREFERRED EMBODIMENT

The embodiments of the present invention are explained below by referring to the attached drawings.

FIG. 4 is a block diagram showing a part of the configuration of the reception device including the synchronization determination apparatus according to an embodiment of the present invention.

In FIG. 4, the receiving wave (modulated wave) received by the reception unit not shown in the attached drawings is temporarily transformed to a receiving modulation signal as an intermediate frequency signal, and input as a primary signal to a demodulation unit 1.

The demodulation unit 1 is a digital demodulator of a synchronous detection system, demodulates a primary signal, and outputs the demodulated data as a bit stream. The demodulation unit 1 performs control to adjust the oscillation frequency of the voltage control oscillator in the demodulation unit 1 to allow it to track the carrier frequency of the primary signal (receiving modulation signal) according to the control signal input from a sequencer 3.

A synchronization unit 2 determines whether or not the first condition with which it can be determined that frame synchronization has been successfully performed by detecting a synchronous pattern from the demodulated data input as a bit stream from the demodulation unit 1 from starting the frame synchronization determination (described later in detail) according to the present embodiment, outputs "H" as a synchronization signal when it is determined that the first condition has been satisfied, and otherwise outputs "L" as a synchronization signal. Using the progress of detecting a synchronous pattern in the determination as to whether or not the first condition has been satisfied, it is determined whether or not the second condition with which it can be determined that there is a probability that frame synchronization is successfully performed is satisfied. If it is determined that the second condition has been satisfied, "H" is output as a pre-synchronization signal. Otherwise, "L" is output as a pre-synchronization signal. The synchronization unit 2 outputs, as primary signal output to a later stage, the demodulated data input as a bit stream from the demodulation unit 1.

Figure 2:
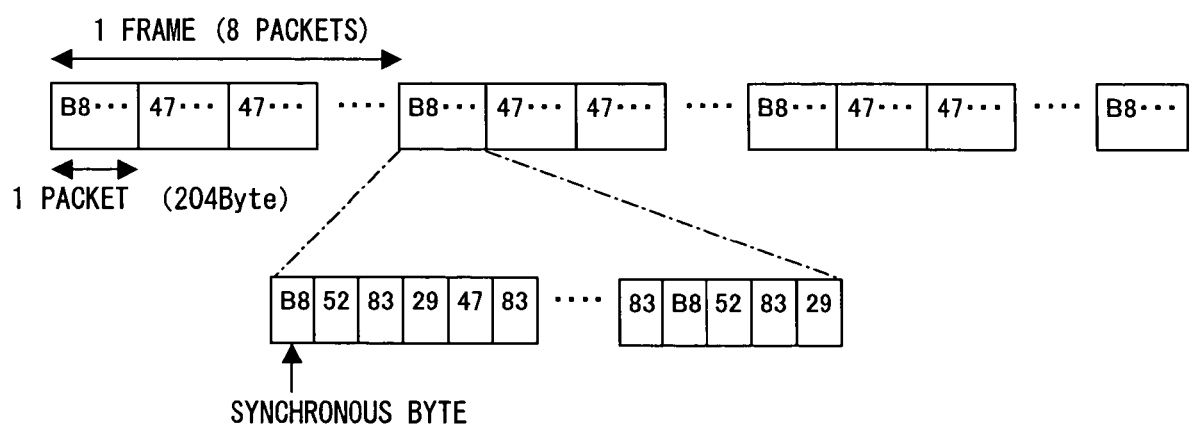
FIG. 2 shows an example of a synchronous pattern detected in demodulated data.

In the present embodiment, the synchronous pattern detected by the synchronization unit 2 from demodulated data is assumed to be the synchronous bytes in the bit stream of the frames, wherein one packet is formed by 204 bytes and one frame is formed by one packet having synchronous byte of 0xB8 as a leading byte, and seven packets each having synchronous byte of 0x47 as a leading byte, as the synchronous bytes explained above by referring to FIG. 2. The first condition is that all synchronous bytes in five continuous frames are detected, and the second condition is that all synchronous bytes in two continuous frames are detected.

The sequencer 3 outputs a control signal to the demodulation unit 1 according to the pulling sequence of the present embodiment. It also detects the status of pre-synchronization signal input from the synchronization unit 2 and the synchronization signal, and outputs the control signal corresponding to the status to the demodulation unit 1.

With the configuration, the pulling operation performed according to the pulling sequence of the present embodiment is explained below.

Figure 1:
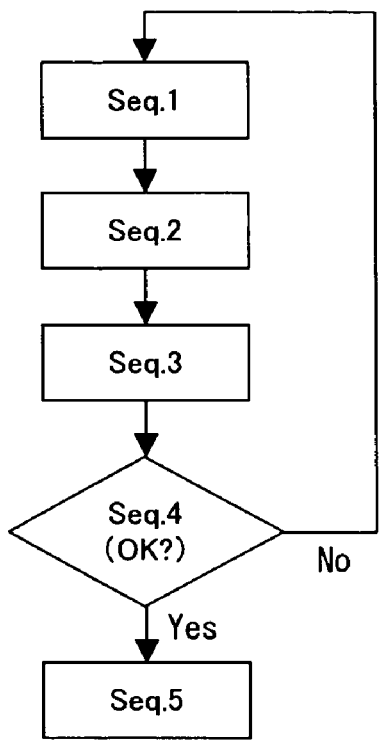
FIG. 1 is a flowchart showing an example of a conventional pulling sequence.

With reference to the pulling sequence according to the present embodiment, the contents of the sequence relating to frame synchronization determination are different from those of the frame synchronization determination in seq. 4 shown in FIG. 1. Otherwise, the pulling sequence according to the present embodiment is basically the same as the pulling sequence shown in FIG. 1. In the explanation of the pulling sequence according to the present embodiment, the sequence in the frame synchronization determination is expressed by seq. 4', and other sequences are expressed as is by seq. 1 through 5.

In the pulling sequence according to the present embodiment, first in seq. 1 through 3, the control of adjusting the oscillation frequency of the voltage control oscillator in the demodulation unit 1 to track the carrier frequency of the primary signal (receiving modulation signal) in the order of low, intermediate, and high precision is performed according to the control signal output from the sequencer 3 to the demodulation unit 1.

Then, in seq. 4', the frame synchronization determination according to the present embodiment is performed. In the frame synchronization determination in seq. 4 shown in FIG. 1, control is returned to seq. 1 only when it is determined that frame synchronization has been successfully performed. In the frame synchronization determination in seq. 4', in addition to the determination as to whether or not frame synchronization has been successfully performed, it is determined during the determination using the progress of the determination whether or not there is a probability that frame synchronization is successfully performed, the determination as to whether or not frame synchronization has been successfully performed is continued only when it is determined that there is the probability. When it is determined that there is no possibility that frame synchronization is successfully performed, the determination as to whether or not frame synchronization is successfully performed is discarded, and control is returned to seq. 1. That is, when it is determined that there is no possibility, control is returned to seq. 1 also.

In more detail, in seq. 4', by determining whether or not the sequencer 3 has detected the synchronization signal of "H" in the first predetermined time from the start of seq. 4', it is determined whether or not frame synchronization has been successfully performed. During the determination, by determining whether or not the sequencer 3 has detected the pre-synchronization signal of "H" in the second predetermined time (on the condition of second predetermined time<first predetermined time) from the start of seq. 4', it is determined whether or not there is the probability that frame synchronization is successfully performed. When the sequencer 3 detects the pre-synchronization signal of "H" in the second predetermined time from the start of seq. 4', it is determined that there is a probability that frame synchronization is successfully performed, and the determination as to whether or not frame synchronization has been successfully performed is continued. On the other hand, when the sequencer 3 does not detect the pre-synchronization signal of "H" in the second predetermined time from the start of seq. 4', it is determined that there is no possibility that frame synchronization is successfully performed, the determination as to whether or not frame synchronization has been successfully performed is discarded, and control is returned to seq. 1.

Figure 5:
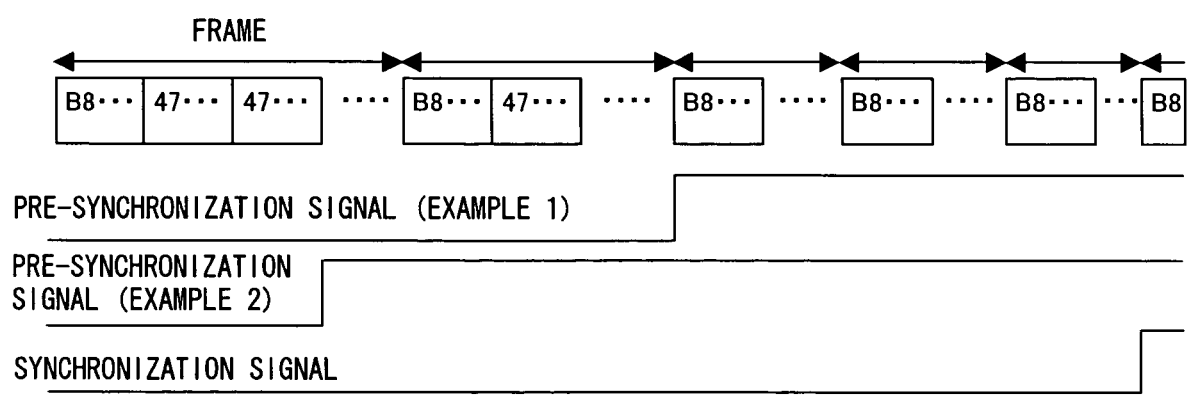
FIG. 5 shows a practical example of the frame synchronization determination of seq. 4'.

By referring to FIG. 5, a practical example of the frame synchronization determination in seq. 4' is explained.

FIG. 5 shows an example of a pre-synchronization signal used when the second condition is that all synchronous bytes in two continuous frames are detected as a pre-synchronization signal (example 1) together with an example of a pre-synchronization signal used when the second condition is that all synchronous bytes in three continuous packets are detected as a pre-synchronization signal (example 2).

As shown in FIG. 5, if the pre-synchronization signal indicates "H" when the second condition is satisfied within the second predetermined time after the start of seq. 4', then it is determined that there is a probability that frame synchronization is successfully performed, and the determination as to whether or not frame synchronization has been successfully performed is continued as is. If the first condition (all synchronous bytes in five continuous frames have been detected) is satisfied in the first predetermined time from the start of seq. 4' and the synchronization signal indicates "H", then it is determined that frame synchronization has been successfully performed.

If it is determined that frame synchronization has been successfully performed in the frame synchronization determination in seq. 4', then control is passed to seq. 5, the pulling sequence is completed, and control is passed to a monitor sequence.

Figure 6:
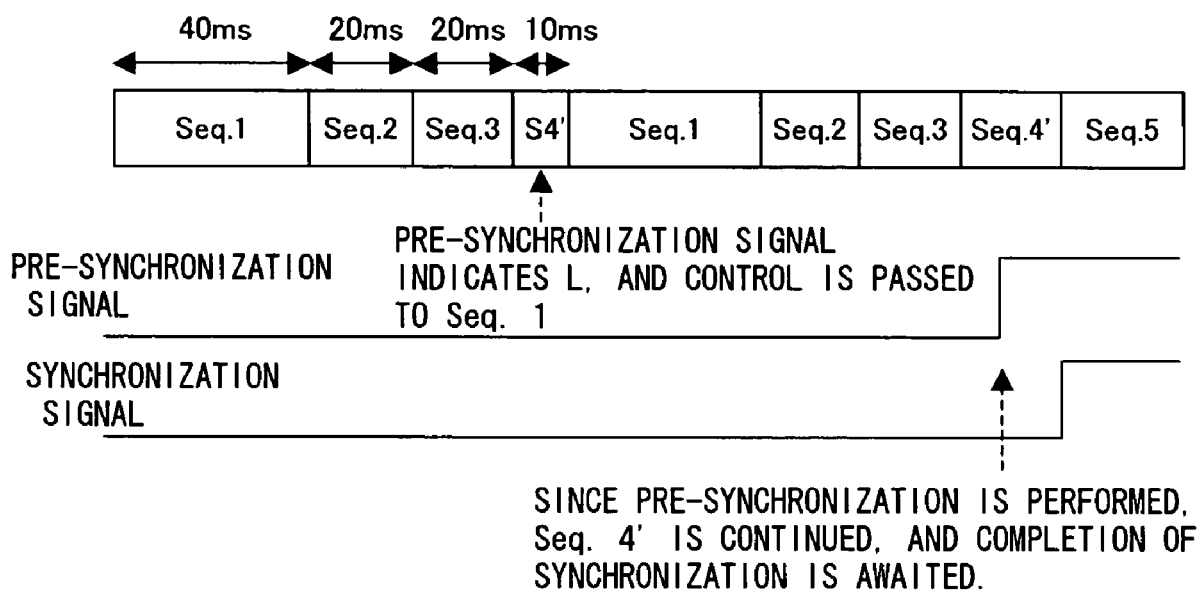
FIG. 6 shows a practical example of actually performing an pulling operation by allocating time to each sequence in an pulling sequence according to an embodiment of the present invention.

FIG. 6 shows a practical example of operating an actual pulling operation by assigning time to each sequence in the pulling sequence according to the present embodiment.

Figure 3:
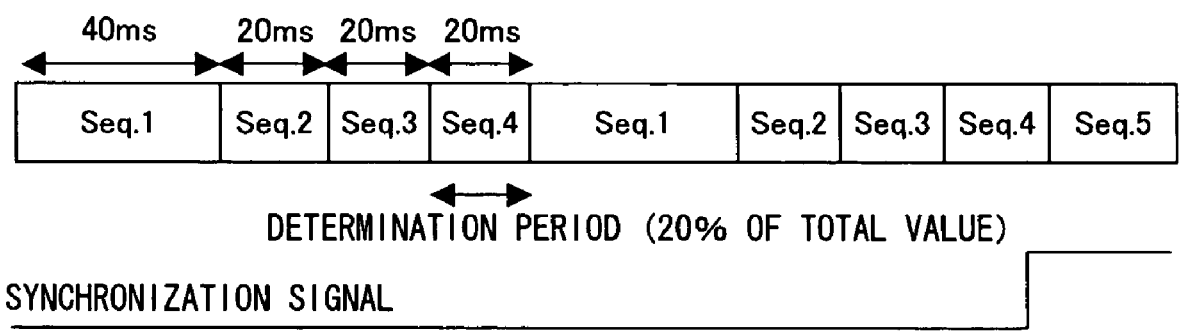
FIG. 3 shows a practical example of actually performing an pulling operation by allocating time to each sequence in the conventional pulling sequence.

In the present embodiment, as the assignment shown in FIG. 3, assume that 40 ms, 20 ms, and 20 ms are respectively assigned to seq. 1, seq. 2, and seq. 3, that 20 ms is assigned as the first predetermined time of seq. 4', and that 10 ms is assigned as the second predetermined time.

In this case, as shown in FIG. 6, in seq. 4' in the first period (expressed by S4' for saving space in the attached drawings), since the pre-synchronization signal remains "L", not "H" in the second predetermined time (in 10 ms) after the start of seq. 4', it is determined that there is no possibility that frame synchronization is successfully performed, the determination as to whether or not frame synchronization has been successfully performed is discarded, and control is returned to seq. 1. Afterwards, in seq. 4' in the second period, since the pre-synchronization signal indicates "H" in the second predetermined time (in 10 ms) after the start of seq. 4', it is determined that there is a probability that frame synchronization is successfully performed, and the determination as to whether or not frame synchronization has been successfully performed is continued. Since the synchronization signal indicates "H" in the first predetermined time (in 20 ms) after the start of seq. 4' in the second period, it is determined that frame synchronization has been successfully performed, and control is passed to seq. 5.

In this case, the total time required in seq. 1 through 4' in the first period is 90 ms while the total time required in seq. 1 through 4 in the first period shown in FIG. 3 is 100 ms, thereby as much as 10% shortening the time.

Thus, in the frame synchronization determination in seq. 4' according to the present embodiment, during the determination as to whether or not frame synchronization has been successfully performed, using the progress of the determination, it is also determined whether or not there is the probability that frame synchronization is successfully performed. Since control is returned to seq. 1 immediately after it is determined that there is no possibility that frame synchronization is successfully performed, the time required to perform the frame synchronization determination when there is no possibility that frame synchronization is successfully performed can be saved, thereby shortening the total time required in completing the pulling sequence.

With the synchronization determination apparatus according to the present embodiment, the time required to perform the frame synchronization determination made when there is no possibility that frame synchronization is successfully performed can be saved, thereby performing the pulling operation at a high speed.

The present invention is described above in detail, but the present invention is not limited to the embodiments above, and can be applied with various improvements and variations within the scope of the gist of the present invention.

According to the present invention, the time required to perform the synchronization determination made when there is no possibility that synchronization is successfully performed can be saved, thereby performing the pulling operation at a high speed.

What is claimed is:

1. A synchronization determination method, comprising:
a synchronization determining step of determining whether or not synchronization has been successfully performed by detecting a synchronous pattern from a demodulated data input as a data stream;
a synchronization probability determining step of determining whether or not there is a probability that synchronization is successfully performed using progress of detecting a synchronous pattern in the synchronization determining step; and
a synchronization determination discard step of discarding a determination in the synchronization determining step when it is determined in the synchronization probability determining step that there is no probability that synchronization is successfully performed, and passing control to a process performed when it is determined in the synchronization determining step that synchronization has not been successfully performed, wherein
the synchronization determining step determines whether or not synchronization has been successfully performed based on whether or not a synchronous pattern has been detected in a first amount of predetermined continuous data in the demodulated data input as the data stream,
the synchronization determining step determines that synchronization has been successfully performed when a synchronous pattern has been detected in the first amount of predetermined continuous data in a first predetermined time after a start of a determination as to whether or not synchronization has been successfully performed, and
the synchronization probability determining step determines that there is a probability that synchronization is successfully performed when a synchronous pattern is detected in a second amount of predetermined continuous data smaller than the first amount of predetermined continuous data in a second predetermined time shorter than the first predetermined time after a start of a determination in the synchronization determining step as to whether or not synchronization has been successfully performed.

2. The method according to claim 1, further comprising
a synchronization determination continuing step of continuing a determination in the synchronization determining step when it is determined in the synchronization probability determining step that there is a probability that synchronization is successfully performed.

3. The method according to claim 1, wherein
the synchronization probability determining step determines whether or not synchronization is successfully performed based on whether or not a synchronous pattern has been detected in a second amount of predetermined continuous data smaller than the first amount of predetermined continuous data during detection of a synchronous pattern in the synchronization determining step.

4. A synchronization determination apparatus, comprising:
a synchronization determination unit determining whether or not synchronization has been successfully performed by detecting a synchronous pattern from a demodulated data input as a data stream; and
a synchronization probability determination unit determining whether or not there is a probability that synchronization is successfully performed using progress of detecting a synchronous pattern by the synchronization determination unit, wherein
the synchronization determination unit determines whether or not synchronization has been successfully performed based on whether or not a synchronous pattern has been detected in a first amount of predetermined continuous data in the demodulated data input as the data stream,
the synchronization determination unit determines that synchronization has been successfully performed when a synchronous pattern has been detected in the first amount of predetermined continuous data in a first predetermined time after a start of a determination as to whether or not synchronization has been successfully performed, the synchronization probability determination unit determines that there is a probability that synchronization is successfully performed when a synchronous pattern is detected in a second amount of predetermined continuous data smaller than the first amount of predetermined continuous data in a second predetermined time shorter than the first predetermined time after a start of a determination by the synchronization determination unit as to whether or not synchronization has been successfully performed, and
a determination made by the synchronization determination unit is discarded when it is determined by the synchronization probability determination unit that there is no probability that synchronization is successfully performed, and control is passed to a process performed when it is determined by the synchronization determination unit that synchronization has not been successfully performed.

5. The apparatus according to claim 4, wherein
the synchronization determination unit continues a determination when it is determined by the synchronization probability determination unit that there is a probability that synchronization is successfully performed.

6. The apparatus according to claim 4, wherein
the synchronization probability determination unit determines whether or not synchronization is successfully performed based on whether or not a synchronous pattern has been detected in a second amount of predetermined continuous data smaller than the first amount of predetermined continuous data during detection of a synchronous pattern by the synchronization determination unit.

7. A synchronization determination apparatus, comprising:
a synchronous pattern detection unit outputting a signal indicating that a first condition has been satisfied as a synchronization signal when a first condition with which it can be determined that synchronization has been successfully performed by detecting a synchronous pattern from demodulated data input as a data stream is satisfied, and outputting a signal indicating that a second condition has been satisfied as a pre-synchronization signal when a second condition with which it can be determined that there is a probability that frame synchronization is successfully performed is satisfied; and
a determination unit determining based on the synchronization signal whether or not synchronization has been successfully performed, and determining based on the pre-synchronization signal whether or not there is a probability that synchronization is successfully performed, wherein
the determination unit discards a determination as to whether or not synchronization has been successfully performed when it cannot be determined within a predetermined time from starting a determination as to whether or not synchronization has been successfully performed that there is a probability that synchronization is successfully performed, and passes control to the process performed when it is determined that synchronization has not been successfully performed.

8. The apparatus according to claim 7, wherein the determination unit continues a determination as to whether or not synchronization has been successfully performed when it is determined that there is a probability that synchronization is successfully performed in a predetermined time after a start of a determination as to whether or not synchronization has been successfully performed.

9. The apparatus according to claim 7, wherein the first condition is that a synchronous pattern has been detected in a first amount of predetermined continuous data in demodulated data input as the data stream; and the second condition is that a synchronous pattern has been detected in a second amount of predetermined continuous data smaller than the first amount of predetermined continuous data in demodulated data input as the data stream.

10. The method according to claim 1, wherein the synchronization determining step comprises a synchronization determination continuing step of continuing a determination in the synchronization determining step when it is determined in the synchronization probability determining step that there is a probability that synchronization is successfully performed.

* * * * *